(12) United States Patent
Johannsen et al.

(10) Patent No.: US 6,768,870 B1
(45) Date of Patent: Jul. 27, 2004

(54) TRANSPARENT FIBER-OPTIC COMMUNICATION NETWORK

(75) Inventors: Reinhard Johannsen, Taufkirchen (DE); Stefan Asch, Puchheim (DE); Hubert Jaeger, Pullach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/520,176

(22) Filed: Mar. 7, 2000

(30) Foreign Application Priority Data

Mar. 10, 1999 (DE) ......................................... 199 10 646

(51) Int. Cl.[7] ........................... G02F 1/00; H04B 10/08; H04B 10/20
(52) U.S. Cl. ................................ 398/33; 398/3; 398/4; 398/5; 398/13; 398/25; 398/59
(58) Field of Search .................. 359/110, 118, 359/119, 127, 167, 177; 398/1–5, 13, 17, 25, 31, 33, 59, 67

(56) References Cited

U.S. PATENT DOCUMENTS

| | | | |
|---|---|---|---|
| 5,369,520 A | | 11/1994 | Avramopoulos et al. ..... 359/176 |
| 5,442,623 A | * | 8/1995 | Wu .............................. 370/224 |
| 5,790,293 A | | 8/1998 | Frigo .......................... 359/173 |
| 6,046,833 A | * | 4/2000 | Sharma et al. .............. 359/119 |
| 6,115,154 A | * | 9/2000 | Antoniades et al. .......... 398/4 |
| 6,339,488 B1 | * | 1/2002 | Beshai et al. ............... 359/119 |
| 6,542,511 B1 | * | 4/2003 | Livermore et al. ......... 370/406 |

FOREIGN PATENT DOCUMENTS

DE 43 37 089 5/1995

OTHER PUBLICATIONS

Johansson et al, "A Cost–Effective Approach to Introduce and Optical WDM Network in the Metropolitan Environment", *IEEE Journal on Selected Areas in Communications*, vol. 16, No. 7, Sep. 1998, pp. 1109–1122.

* cited by examiner

Primary Examiner—M. R. Sedighian
(74) Attorney, Agent, or Firm—Bell Boyd & Lloyd LLC

(57) ABSTRACT

In a transparent fiber-optic communication network with several central systems that are interconnected by optical fibers, to which systems at least one decentralized system is connected via two optical feed fibers, at least one first and at least one second optical fiber are connected to the decentralized optical system by a first and a second optical feed fiber in an optically transparent manner through a monitoring equipment of the central system.

10 Claims, 2 Drawing Sheets

TRANSPARENT FIBER-OPTIC COMMUNICATION NETWORK

BACKGROUND OF THE INVENTION

In fully optical communication networks, particularly metropolitan ring communication networks, which are in the process of being set up or upgraded, optical fibers between two neighboring network nodes, which fibers are available for the connection of neighboring network nodes to one another, are frequently not fully occupied. In other words, a multiple access of the individual optical fibers using the wavelength division multiplex technique known as WDM is not necessary in such an upgrading stage or when the present fiber capacities of the optical communication network are utilized at such a low level.

In conventionally known network architectures, it is possible to provide an unused optical fiber that connects several network nodes to one another for one network customer exclusively, over which fiber the network customer can receive data from the fiber-optic communication network or transmit data to it. These kinds of optical fibers which are reserved for one network customer are known in the field as "dark fibers", due to the fact that the optical signal transmitted in the optical fiber in the fiber-optic communication network is generally by the laser of the network customer, exclusively, and the optical signal received in the network node is never converted and resent, for example with another wavelength, by the network operator.

In these types of network architectures, however, the possibility of providing a dark fiber is only provided in addition to the primary data transmission with the aid of the WDM technique. Thus, usually the optical feed fibers of a network customer are led to the WDM multiplexer situated in the network node, with the aid of which the optical signals received in the network nodes via several feed fibers are multiplexed into a common optical fiber connecting the individual network nodes (see "A Cost Effective Approach to Introduce an Optical WDM Network in the Metropolitan Environment", Johansson et al, *IEEE Journal on Selected Areas in Communications*, Vol. 16, No. 7, September 1998, pp. 1109–1121). However, when a network customer is connected via such dark fibers, it is not possible to monitor the transmission quality or to detect the transmitted data rates, which may be necessary for a charge increase on the part of the network operator. In addition, safety measures have not been provided in known communication networks in case of operational failure of the dark fibers, such as the emission of an alarm signal to the respective optical network node, by which measures it would have been possible to localize errors quickly and reliably. In addition, until now, there has been no known protective circuits for the dark fibers which could effectuate a changeover onto the redundant optical dark fiber in case of breakage of the active optical dark fiber. Because of the absence of these surface capabilities, it is possible for the network operator to provide only extremely few network customers with a connection via a dark fiber.

In addition, from the network operator's perspective for the sake of optimal exploitation of the usually available fiber capacities (for instance, up to 100 optical ring fibers) and particularly for the sake of upgrading an existing fully optical communication network, it is desirable to be able to operate the fully optical communication network without the aid of the WDM technique and to make possible a gradual implementation of the WDM technique in the course of the network upgrade; in other words, to be able to set up the fiber-bound communication network in a modular fashion.

SUMMARY OF THE INVENTION

The object of the present invention is to improve the connection of the network customers to the optical fibers connecting the network nodes of the fiber-optic communication network, with respect to the monitoring of the optical fibers or the optical feed fibers, the regeneration of the optical signals, and the reliability of the connections that are connected via the optical fibers or, respectively, the optical feed fibers. Thus, it is possible to make a gradual upgrading of the optical communication network, initially without using the WDM technique.

The object is achieved in accordance with the improvement in a transparent fiber-optic communication network having several central systems that are connected to one another via optical fibers, to which systems at least one decentralized system is connected via two optical fibers. The improvement is that at least one of the central systems has monitoring equipment and a first optical fiber is connected to one of the decentralized optical systems by a first optical feed fiber in an optically transparent fashion through the monitoring equipment and a second optical fiber is connected to this one decentralized optical system by a second optical feed fiber in an optically transparent manner through the monitoring equipment.

The essential aspect of the inventive transparent fiber-optic communication network having several central systems that are connected to one another via optical fibers, to which at least one decentralized system is respectively connected via two optical feed fibers is that a first optical fiber is connected by a first optical feed fiber to one of the decentralized optical systems in an optically transparent manner via a monitoring equipment and that a second optical fiber is connected by a second optical feed fiber to this decentralized optical equipment in an optically transparent manner via the monitoring equipment. In the inventive transparent fiber-optic communication network, the feed fibers of a decentralized system, for example the communication equipment of the network customer, are advantageously led to the as yet unused optical fibers connecting the central optical system. It thus becomes possible to forego the cost-intensive and, in the set-up of a communication network partially inefficient, provision of a WDM multiplexer in the central system, especially since multiple usage of the individual optical fibers with the aid of the WDM technique represents a high technical cost, which is unnecessary due to the typically low load on the communication network during set-up or, respectively, the upgrading of the communication network. In addition, the inventive monitoring equipment advantageously ensures a reliable and safe operation, both of the optical feed fibers and of the optical ring fibers and thereby makes possible a rapid and reliable localization of errors given a failure of the optical fibers or the optical feed fibers. In addition, by virtue of the module construction of the inventive communication network, it is possible to expand the communication network or, respectively, the respective optical network node, by a WDM multiplexer for multiple accessing of individual optical fibers, which is necessary given increasing usage of the communication network.

According to a further development of the inventive method, the fiber optical fiber is connected by the first optical feed fiber to the decentralized optical system in an optically transparent manner via a regeneration equipment or unit as well as the monitoring equipment, and the second optical fiber is connected to the decentralized system by the regeneration equipment or unit as well as the monitoring equipment in an optically transparent manner by the second feed fiber. The regeneration equipment or unit is provided for the purpose of restoring the optical transmitted level of the optical signals that are transmitted over the optical feed fiber and/or over the optical fibers. Due to the regeneration equipment, the optical signals that are received in the network nodes are not only monitored by the monitoring equipment, but also regenerated so that the original optical signals is partly or completely recovered, for instance with respect to its transmitted level, and can thus be transmitted more reliably. The number of transmission errors generated by an optical signal level that is too weak is thus reduced.

An advantageous development is that the monitoring equipment is provided for monitoring the data rate of the data currently being transmitted between the decentralized and the central optical systems. Advantageously, the data rate used by the network customer for transmission of his data into and out of the fiber-optic communication network can be monitored by the inventive monitoring equipment, and thus the costs that accrue for the use of the fiber-optic communication network can be indicated to the network customer by the network operator in a transparent manner.

Other advantages and features of the invention will be readily apparent from the following description of the preferred embodiments, the drawings and claims.

DESCRIPTION OF THE PREFERRED EMBODIMENTS

Figure 1:
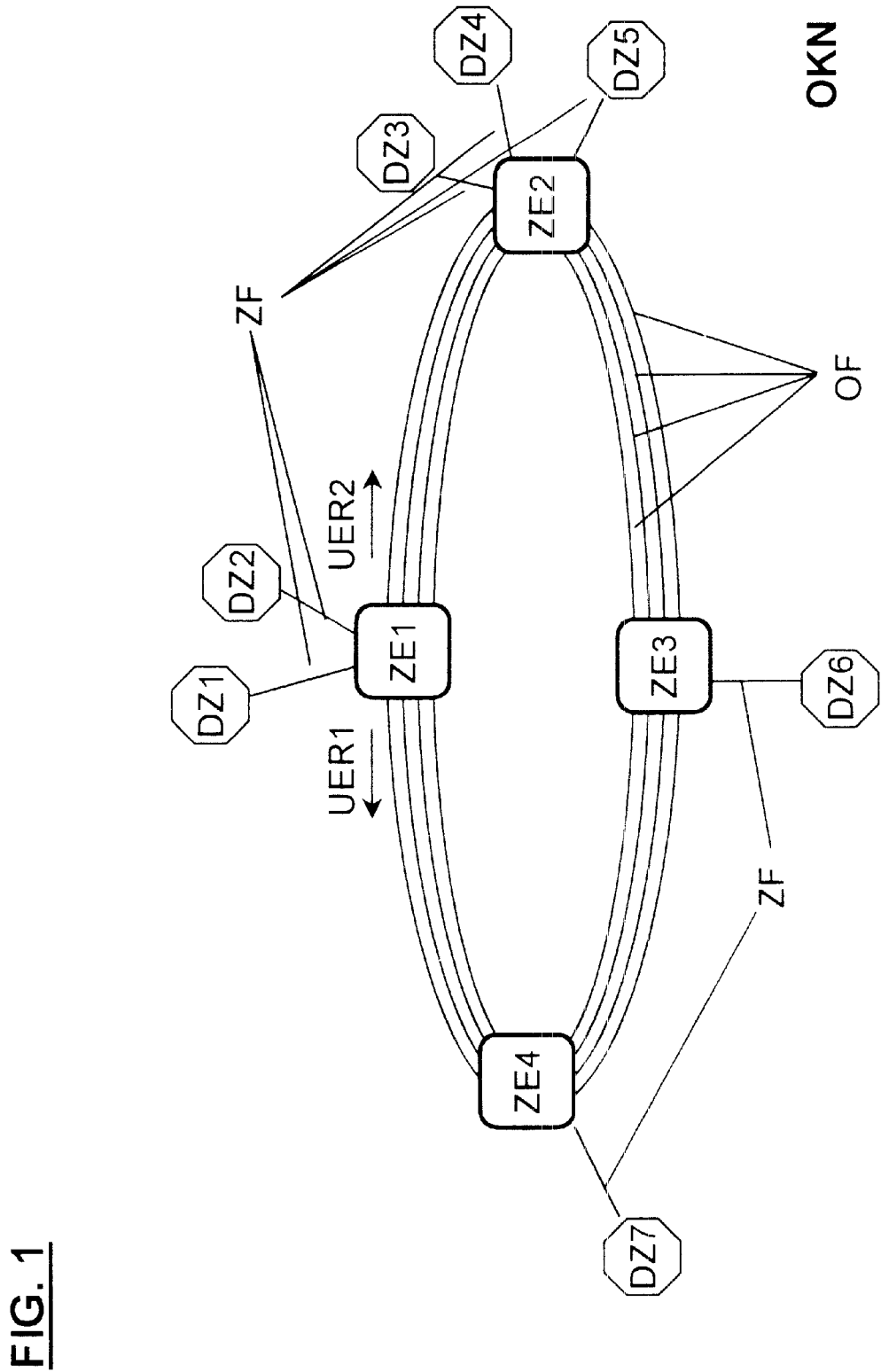
FIG. 1 is a principal circuit diagram of the inventive transparent fiber-optic communication network.

The principles of the present invention are particularly useful when incorporated in a transparent fiber-optic communication network OKN, which is illustrated in FIG. 1 and comprises a ring network topology. In the network OKN, first, second, third and fourth optical network nodes ZE1–ZE4 for a plurality of possible central optical systems or, respectively, optical network nodes ZE, are provided. The individual optical network nodes are each connected to the respective adjacent nodes via optical fibers OF. That is, the first optical network node ZE1 is connected to the second optical network node ZE2 by fibers OF; the second optical network node ZE2 is connected by fibers OF to the third optical network node ZE3; the third optical network node ZE3 is connected by fibers OF to the fourth node ZE4 and the fourth optical network node ZE4 is connected by fibers OF to the first optical network node ZE1 to form a transparent fiber-optic communication network OKN having a ring network topology. FIG. 1 exemplarily illustrates four optical fibers OF out of a plurality thereof. Furthermore, the optical fibers OF are operated in a unidirectional operational mode, wherein a transmission of optical signals os over the optical fibers OF is possible in both a first direction UER1 and in a second, opposite direction UER2. That is, a first or second direction UER1 or UER2 is allocated to each of the optical fibers in an application-oriented manner.

First, second, third, fourth, fifth, sixth and seventh decentralized optical systems DZ1–DZ7 for a plurality of possible decentralized optical devices or, respectively, optical communication devices of a network customer DZ are also illustrated in FIG. 1. The first and second decentralized systems DZ1 and DZ2 are connected by optical feed fibers ZF to the first optical network node ZE1; the third, fourth and fifth decentralized optical systems DZ3, DZ4 and DZ5 are connected by optical feed fibers ZF to the second optical network node ZE2; the sixth decentralized optical system DZ6 is connected by optical feed fibers ZF to the third optical network node ZE3 and the seventh decentralized optical system DZ7 is connected by optical feed fibers ZF to the fourth optical network node ZE4.

Figure 2:
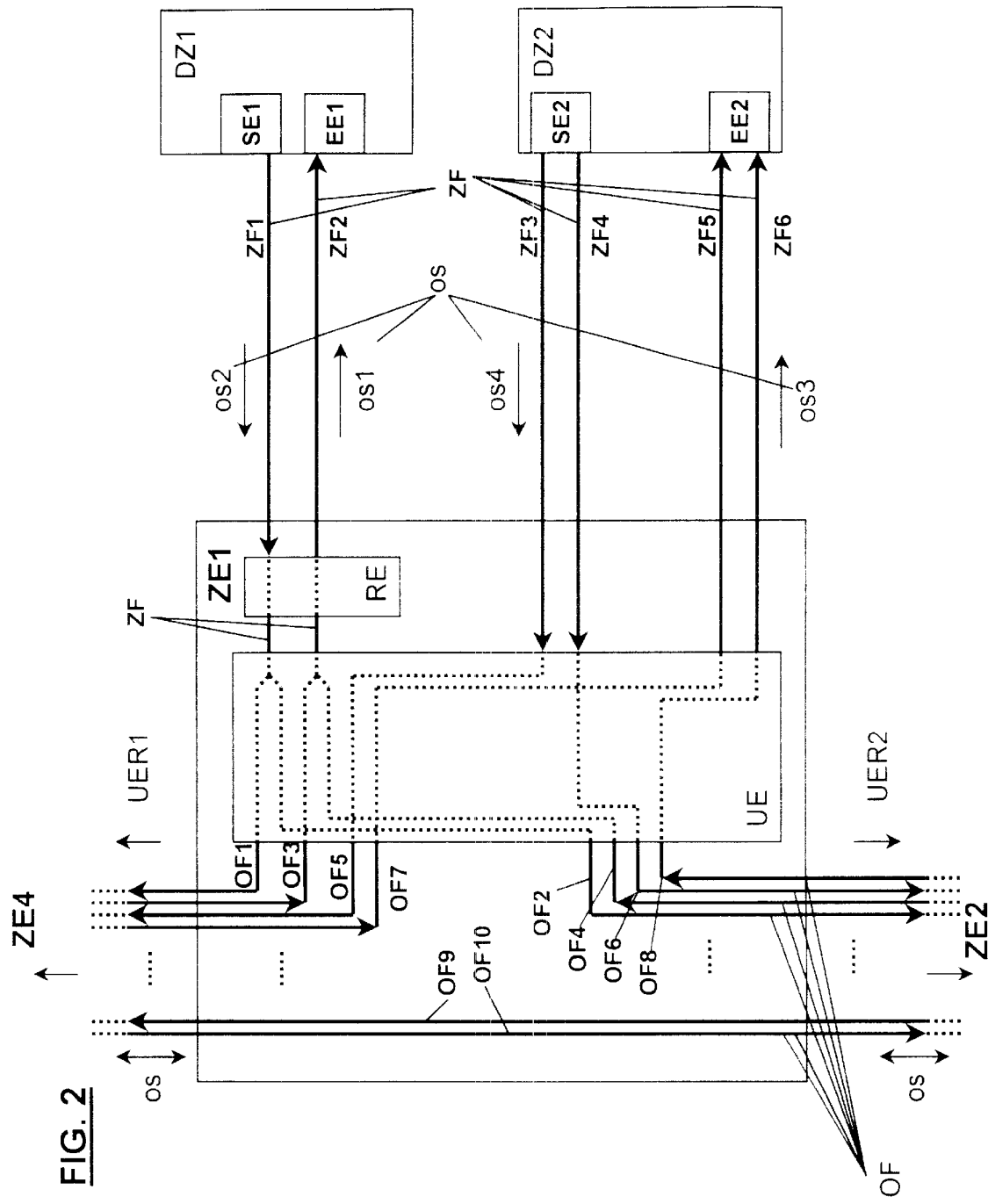
FIG. 2 is another principal circuit diagram exemplarily depicting the connection of two communication devices of a network customer to an optical network node of the inventive transparent fiber-optic communication network.

The first optical network node ZE1 with the decentralized optical systems DZ1 and DZ2 are illustrated in FIG. 2. As illustrated, the decentralized optical systems DZ1 and DZ2 are connected to the node ZE1 through optical feed fibers ZF, wherein a first optical receiving unit EE1 for receiving optical signals os and a first optical transmitter SE1 for transmitting optical signals os are provided in the first optical decentralized system DZ1. In a similar way, a second optical receiving unit EE2 for receiving optical signals os and a second optical transmitting unit SE2 for transmitting optical signals os are provided in the second decentralized system DZ2.

The first optical network node ZE1 inventively comprises a monitoring unit, equipment or means UE for monitoring the operational status of the optical feed fibers ZF1–ZF6 and/or the optical fibers OF that are led to the optical monitoring equipment UE. The monitoring unit UE also monitors the data rate of the data currently being transmitted between the first and second decentralized systems DZ1 and DZ2 and the first central optical system ZE1. Furthermore, a regenerating or regeneration unit or means RE is provided in the first optical network node ZE1 for the purpose of recovering the original transmitted level of the optical signals os that are transmitted over the optical feed fibers ZF and/or over the optical fibers OF. The regeneration unit RE is connected to the monitoring equipment UE via the optical feed fibers ZF in FIG. 2, which first and second optical feed fibers ZF1 and ZF2 are led to the regenerating unit RE. Furthermore, with the aid of the regeneration equipment RE, the transmitted signal pulses can also be regenerated with pulse shaping and/or the signal clock can be recovered with retiming. In a further development of the inventive communication network, which is not illustrated in FIG. 2, the optical fibers OF are led to the regeneration unit or equipment RE directly, and the regeneration equipment or unit RE is connected to the monitoring equipment via optical feed fibers ZF, in turn. For example, FIG. 2 shows first, second, third, fourth, fifth, sixth, seventh, eighth, ninth and tenth optical fibers OF1–OF10 from a plurality thereof, which are connected to the first optical network node ZE1. Here, the ninth and tenth optical fibers OF9 and OF10 are led through the first optical network node ZE1, and in the first optical network node ZE1, a decentralized optical system DZ is not connected to the ninth or tenth optical fibers OF9 and OF10. The first, third, fifth and seventh optical fibers OF1, OF3, OF5 and OF7 connect the fourth network node ZE4 to the first network node ZE1 and are led in the first network node ZE1 directly to the monitoring equipment UE, for example. In a similar way, the first optical network node ZE1 is connected to the second optical network node ZE2 by the second, fourth, sixth and eighth optical fibers OF2, OF4, OF6 and OF8, which are led in the first optical network node ZE1 directly to the monitoring equipment UE.

FIG. 2 further shows that the first direction of the optical transmission UER1, which is provided for the transmission of the optical signals in the first direction from the first to optical network node ZE1 to the fourth optical network node ZE4 and the second direction of optical transmission UER2, which is provided for the transmission of the optical signals os in the direction from the first network node ZE1 to the second network node ZE2. The first, fourth, fifth, eighth and ninth optical fibers OF1, OF4, OF5, OF8 and OF9 are operated unidirectionally in the first transmission direction UER1, and the second, third, sixth, seventh and tenth optical fibers OF2, OF3, OF6, OF7 and OF10 are operated unidirectionally in the second direction of transmission UER2.

The first decentralized optical system DZ1 is connected to the first network node ZE1 by first and second optical feed fibers ZF1 and ZF2, whereby optical signals os are transmitted from the transmitting unit SE1 of the first decentralized optical system DZ1 to the regeneration equipment or unit RE of the first network node ZE1 by the first optical feed fiber ZF1, and the optical signals os are transmitted from the regeneration unit or equipment RE of the first optical network node ZE1 to the first receiving unit EE1 of the first decentralized optical system DZ1 via the second optical feed fiber ZF2.

On the other hand, the second decentralized optical system DZ2 is connected to the first optical network node ZE1 or, respectively, to the monitoring equipment UE of the first optical network node ZE1 by third, fourth, fifth and sixth optical feed fibers ZF3, ZF4, ZF5 and ZF6. That is, a 1+1 line protection is additionally provided for the connection of the second decentralized optical system DZ2 to the first optical network node ZE1. To this end, the same optical signals os are transmitted from the second transmitting unit SE2 of the second decentralized optical system DZ2 to the monitoring equipment UE of a first optical network node ZE1 approximately simultaneously over the third and fourth optical feed fibers ZF3 and ZF4, and the same optical signals os are transmitted from the monitoring equipment of the first optical network node ZE1 to the receiving unit EE2 of the second decentralized optical system DZ2 approximately simultaneously over the fifth and sixth optical feed fibers ZF5 and ZF6. Thus, the fourth and fifth optical fibers ZF4 and ZF5 are operated in a redundant operational mode.

A first optical signal os1, which is transmitted in the second direction of transmission UER2 of the first optical network node ZE1 over the third optical fiber OF3 is conducted in the first optical network node ZE1 to the monitoring equipment UE and is monitored there with respect to the first optical signal os1 that is redundantly transmitted to the first optical network node ZE1 in the first direction UER1 over the fourth optical fiber OF4. That is, the operational condition of the third and fourth optical fibers OF3 and OF4 is checked with the aid of the received first optical signals os1. The first optical signal os1 is then conducted to the regeneration unit or equipment RE via the one optical feed fiber ZF. The original optical signal level of the received first optical signal os1 is regenerated in this regeneration unit or equipment RE and is then transmitted to the first receiving unit EE1 of the first decentralized optical system DZ1 over the second optical feed fiber ZF2. Upon being received in the first receiving unit EE1 of the first decentralized optical system DZ1, the first optical signal os1 is subsequently processed in the first decentralized optical system DZ1. A second optical signal os2 that is generated by the first optical transmitting unit SE1 is transmitted from the first decentralized optical system DZ1 to the regeneration unit or equipment RE of the first optical network node ZE1 over the first optical feed fiber ZF1. After the second optical signal os2 is regenerated, it is transmitted to the monitoring equipment UE over the other optical feed fiber ZF. In the monitoring equipment UE, the second optical signal os2 is conditioned for transmission over the first and second optical fibers OF1 and OF2, and the operational status of the first optical feed fiber ZF1 is monitored. In addition, the data rate that is allocated to the first decentralized optical system DZ1 is monitored in the monitoring equipment UE. The second optical signal os2 is transmitted actively over the first optical fiber OF1 in the first direction of transmission UER1 and to the fourth optical network node ZE4 and redundantly over the second optical fiber OF2 in the second direction of transmission UER2 to the second optical network node ZE2.

FIG. 2 illustrates another development of the inventive communication network OKN based on enhancing the connection of the second decentralized system DZ2 to the first optical network node ZE1 by a 1+1 line protection. A third optical signal os3, which is transmitted to the first optical network node ZE1 approximately simultaneously over the seventh and eighth optical fibers OF7 and OF8, is conducted in the first network node ZE1 to the monitoring equipment UE. In the monitoring equipment, the operational status of the seventh and eighth optical fibers OF7 and OF8 are checked, and the data rate that is used for the transmission to the second decentralized system DZ2 is checked. In contrast to the above-described connection of the first decentralized system DZ1 to the first optical network node ZE1, in the monitoring equipment the third optical signal os3 that is transmitted over the seventh optical fiber OF7 is conducted to the fifth optical feed fiber ZF5 and is transmitted over this to the second decentralized optical system DZ2. In addition, the third optical signal os3, which is transmitted over the eighth optical fiber OF8, is conducted to the sixth optical fiber ZF6 via the monitoring equipment UE and over this feed fiber to the second decentralized optical system DZ2. The third optical signals os3 transmitted over both the fifth and sixth optical feed fibers ZF5 and ZF6 are received in the second optical receiving unit EE2 in the second decentralized optical system DZ2 and are processed in the second decentralized optical system DZ2.

The fourth optical signal os4, which is generated by the second transmitting device SE2 in the second decentralized optical system DZ2, is transmitted to the first optical network node ZE1 approximately simultaneously over both the third and fourth optical feed fibers ZF3 and ZF4 and is conducted in the first optical network node ZE1 to the monitoring equipment UE. In the monitoring equipment UE, the operational status of the third and fourth optical feed fibers ZF3 and ZF4 and the data rate of the data currently being transmitted between the second decentralized system DZ2 and the optical network node ZE2 are monitored. Subsequently, the fourth optical signal os4 that is transmitted to the monitoring equipment over the third optical feed fiber ZF3 is transmitted actively from the monitoring equipment UE of the first optical network node ZE1 to the fourth optical network node ZE4 over the fifth optical fiber OF5. In a similar way, the fourth optical signal os4 that is redundantly transmitted to the monitoring equipment over the fourth optical feed fiber ZF4 is transmitted redundantly in the second direction of transmission UER2 from the monitoring equipment UE of the first optical network node ZE1 to the second optical network node ZE2 over the sixth optical fiber OF6.

Although various minor modifications may be suggested by those versed in the art, it should be understood that we wish to embody within the scope of the patent granted hereon all such modifications as reasonably and properly come within the scope of our contribution to the art.

We claim:

1. A transparent fiber-optic communication network having several central systems that are connected to one another via optical fibers, each central system connected to at least one decentralized optical system by two optical feed fibers, and including:

monitoring equipment;

a first optical fiber connected to the at least one decentralized optical system by a first optical feed fiber in an optically transparent fashion via the monitoring equipment; and a second optical fiber connected to the at least one decentralized optical system by a second optical feed fiber in an optically transparent manner via the monitoring equipment, wherein the first and second optical feed fibers are operated without using a wavelength division multiplexing technique; and wherein the central system includes a regeneration unit and the first optical fiber is connected to the decentralized optical system by the first optical feed fiber in an optically transparent fashion via the monitoring equipment and via the regeneration unit, and the second optical fiber is connected by a second optical feed fiber to the decentralized optical system through the monitoring equipment and through the regeneration unit.

2. A transparent fiber-optic communication network according to claim 1, wherein the monitoring equipment is provided for monitoring the operational status of the optical feed fibers and the optical fibers.

3. A transparent fiber-optic communication network according to claim 1, wherein the monitoring equipment is provided for monitoring the data rate of the data currently being transmitted between the decentralized optical system and the central optical system.

4. A transparent fiber-optic communication network according to claim 1, wherein the regeneration unit is provided for recovering the original transmitting level of the optical signal and that are transmitted over the optical feed fibers and over the optical fibers.

5. A transparent fiber-optic communication network according to claim 1, wherein at least one of the optical feed fibers can be operated in an active operating mode and at least one of the optical feed fibers can be operated in a redundant operating mode.

6. A transparent fiber-optic communication network according to claim 1, wherein at least one of the optical fibers can be operated in an active operating mode, and at least one of the optical fibers can be operated in a redundant operating mode.

7. A transparent fiber-optic communication network according to claim 1, wherein the optical fibers and the optical feed fibers are operated in a unidirectional mode.

8. A transparent fiber-optic communication network according to claim 1, wherein the transparent fiber-optic communication network is realized as a ring communication network, wherein data is transmitted in a first direction of transmission over optical fibers that are operated in an active operating mode and in a second, opposite direction of transmission over optical fibers that are operated in a redundant operating mode.

9. A transparent fiber-optic communication network according to claim 1, wherein the monitoring equipment is provided for monitoring the operational status of the optical feed fibers and of the optical fibers.

10. A transparent fiber-optic communication network according to claim 1, wherein the monitoring equipment is provided for monitoring the data rate of the data currently being transmitted between the decentralized optical system and the central optical system.

* * * * *